(12) United States Patent
Hasegawa

(10) Patent No.: US 10,191,698 B2
(45) Date of Patent: Jan. 29, 2019

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Shin Hasegawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/453,720

(22) Filed: Mar. 8, 2017

(65) Prior Publication Data

US 2017/0269882 A1 Sep. 21, 2017

(30) Foreign Application Priority Data

Mar. 18, 2016 (JP) .................. 2016-055001

(51) Int. Cl.
| | |
|---|---|
| G06F 3/12 | (2006.01) |
| G06F 9/445 | (2018.01) |
| G06K 15/00 | (2006.01) |
| H04L 29/08 | (2006.01) |

(52) U.S. Cl.
CPC .......... *G06F 3/1226* (2013.01); *G06F 3/1206* (2013.01); *G06F 3/1247* (2013.01); *G06F 3/1285* (2013.01); *G06F 3/1292* (2013.01); *G06F 9/445* (2013.01); *G06F 9/44526* (2013.01); *H04L 67/06* (2013.01)

(58) Field of Classification Search
None
See application file for complete search history.

(56) References Cited

U.S. PATENT DOCUMENTS

2014/0104643 A1\* 4/2014 Park ...................... G06F 3/1206
358/1.15

FOREIGN PATENT DOCUMENTS

JP 2012-48633 A 3/2012

\* cited by examiner

*Primary Examiner* — Dov Popovici
(74) *Attorney, Agent, or Firm* — Canon U.S.A., Inc. IP Division

(57) ABSTRACT

An information processing apparatus includes an application that supports two invoking methods including a first invoking method which is invoked by a first file of an extension supported by the application being shared and a second invoking method which is invoked from a printing system of an operating system by a second file targeted for print processing being received, wherein, in a case where the first file is shared according to the first invoking method, the application invokes the printing system using the shared first file, receives the second file converted from the first file according to the second invoking method, and performs print processing based on the second file.

13 Claims, 15 Drawing Sheets

<intent-filter
    .
    .
    .
  <data android:mimeType="image/*" />
  <data android:mimeType="application/pdf" />
  <data android:mimeType="text/plain" />
    .
    .
    .
</intent-filter>
```

INFORMATION PROCESSING APPARATUS, CONTROL METHOD, AND STORAGE MEDIUM

BACKGROUND

Field of Art

Aspects of this disclosure generally relate to an information processing apparatus, a control method, and a storage medium.

Description of the Related Art

Japanese Patent Application Laid-Open No. 2012-48633 discusses a technique in which a printing application generates print data according to, for example, whether data received from an application serving as a data output source via an Intent is text data or contains a Uniform Resource Locator (URL).

SUMMARY

According to an aspect of an embodiment, an information processing apparatus includes an application that supports two invoking methods including a first invoking method which is invoked by a first file of an extension supported by the application being shared and a second invoking method which is invoked from a printing system of an operating system by a second file targeted for print processing being received, wherein, in a case where the first file is shared according to the first invoking method, the application invokes the printing system using the shared first file, receives the second file converted from the first file according to the second invoking method, and performs print processing based on the second file.

Further features will become apparent from the following description of exemplary embodiments with reference to the attached drawings.

BRIEF DESCRIPTION OF THE DRAWINGS

FIG. 4 illustrates an example of an Intent filter.

DESCRIPTION OF THE EMBODIMENTS

In a mobile operating system (OS), there is a technique to transmit print data to a printer. An OS loaded on a mobile terminal, such as Android®, has a "printing system" which provides a printing function common to applications. The printing system has a mechanism in which each printer vendor is able to add in dependent processing for adapting to its print processing apparatus in a plug-in format, called a "print plug-in". For example, Canon Print Service is provided as a "print plug-in" for Android® and is able to be downloaded and installed from Google Play®.

Methods for the user to perform printing via an application include a method using the printing system and a method using a mechanism called an Intent. The Intent is an application-related mechanism which enables passing (sharing) a file from an application to another application on Android®. Even if an application does not support the printing system, the user is able to perform printing by specifying a printing application via the Intent.

In the technique discussed in Japanese Patent Application Laid-Open No. 2012-48633, since print data has to be generated by a printing application, only a file format which the printing application supports can be converted into print data. Moreover, in a case where no printing application is installed, the printing method discussed in Japanese Patent Application Laid-Open No. 2012-48633 cannot be used. Therefore, even in a case where an application does not support the printing system and there is no printing application usable by the Intent, it is required that a wide variety of file formats, such as image, HyperText Markup Language (HTML), Portable Document Format (PDF), and Office file, can be converted into a page description language (PDL), which is print data, to be printed.

Aspects of this disclosure are generally directed to providing an information processing apparatus with a simplified process of PDL conversion that supports a plurality of formats.

First, an overall configuration of a system in a first exemplary embodiment is described.

Figure 1:
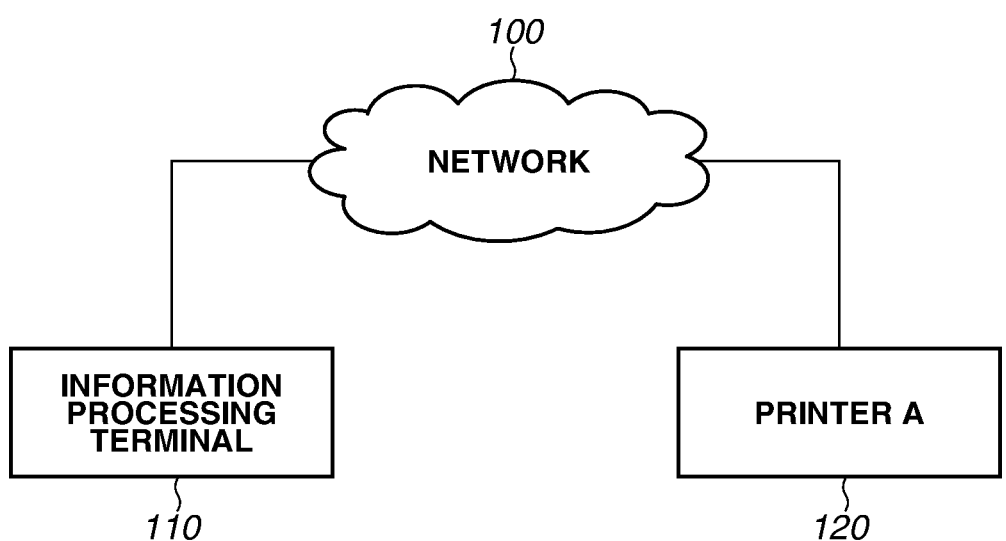
FIG. 1 is an overall configuration diagram of a printing system.

FIG. 1 illustrates an example of an overall configuration of hardware in the present exemplary embodiment. The system includes an information processing terminal 110 and a printer A 120, which are interconnected by a network 100. Then, a plurality of information processing terminals and a plurality of printers can be present on a network. The network 100 is a standard network connection and can be in the form of the Internet or an intranet. The connection method can be any form as long as the information processing terminal 110 and the printer A 120 are interconnected to the network 100. For example, there are a method for forming a network via a Wi-Fi router and a method for directly connecting the information processing terminal 110 and the printer A 120 using Wi-Fi Direct.

Figure 2:
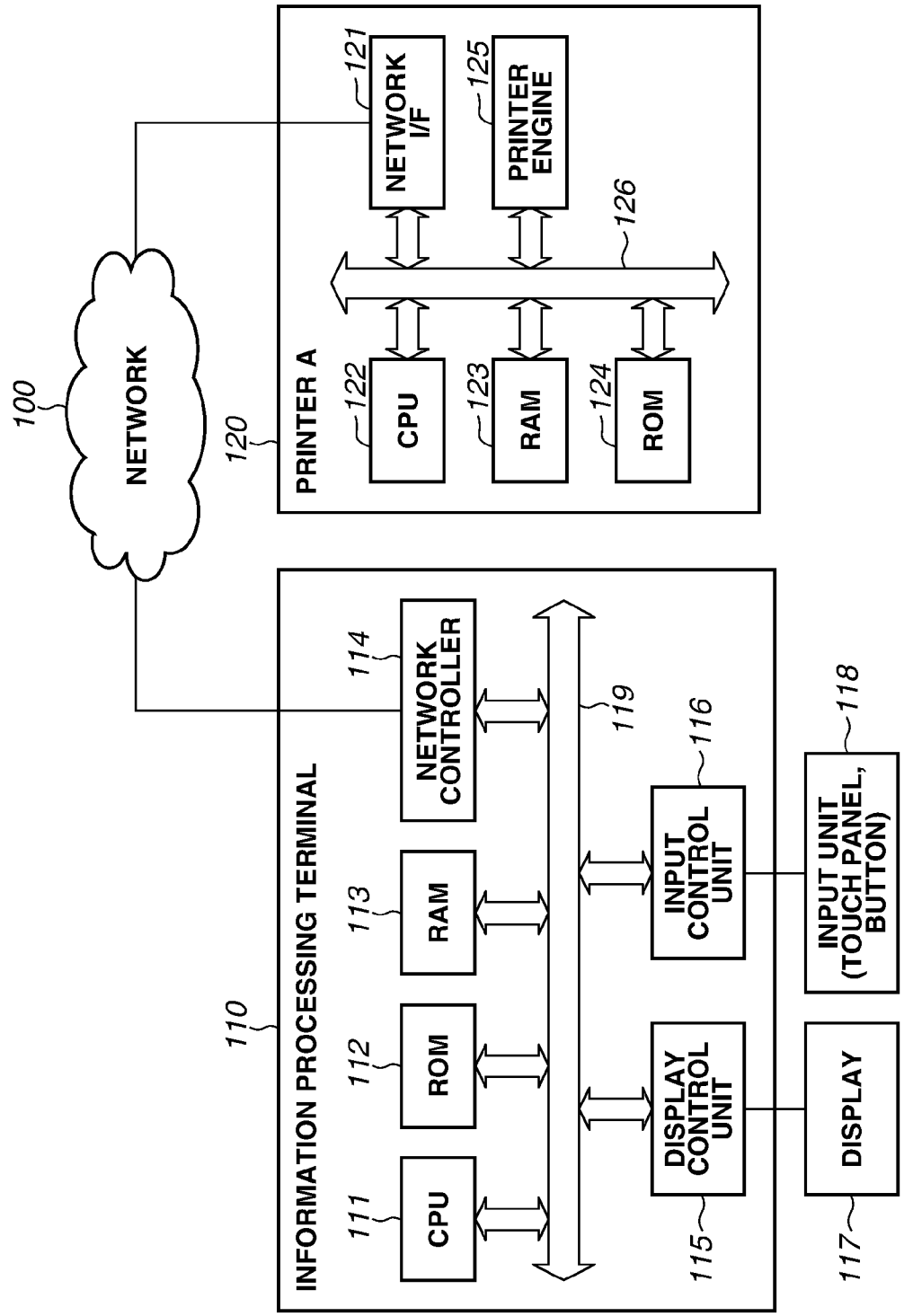
FIG. 2 is a hardware configuration diagram of an information processing terminal and a printer.

Next, a configuration of the information processing terminal 110 and the printer A 120 in the present exemplary embodiment is described with reference to FIG. 2.

The information processing terminal 110 is an ordinary mobile terminal, such as a personal data assistant (PDA) or a smartphone, and is an information processing apparatus on which an operating system for small-sized terminals and programs for controlling a telephone call and data communication run. The information processing terminal 110 is capable of performing wireless communication or wired communication using a network controller 114. Constituent elements of hardware of the information processing terminal 110 are connected to a system bus 119.

A read-only memory (ROM) 112 is a non-volatile storage device, and stores, for example, an OS of the information processing terminal 110, applications for controlling a telephone call and data communication, various operation mode settings required to be retained even after restarting of the information processing terminal 110, and operation logs. Examples of the application for controlling data communication stored in the ROM 112 include e-mail software and a web browser. These pieces of information stored in the ROM 112 are processed by a central processing unit (CPU) 111. Furthermore, a software configuration of the information processing terminal 110 such as that illustrated in FIG. 3 and processing in steps in flowcharts described below are implemented by the CPU 111 performing processing based on programs stored in the ROM 112.

A random access memory (RAM) 113 is a work memory used to execute a program. Moreover, the RAM 113 is used to temporarily store image information generated by an application during printing.

A network controller 114 is arranged to control network communication, and, for example, Wi-Fi, Wi-Fi Direct, public line 3G/4G, or wired local area network (LAN) connection is used for communication.

A display control unit 115 controls information to be output at a display 117 of the information processing terminal 110. An input control unit 116 controls information about instructions issued by the user via, for example, a button or a touch panel on an input unit 118 of the information processing terminal 110. Applications of the information processing terminal 110 provide network communication information and various pieces of information about the information processing terminal 110 to the user using the display control unit 115 and the input control unit 116.

The printer A 120 is an example of an image processing apparatus. A network interface (I/F) 121 is used for connection with the information processing terminal 110 via the network 100. The printer A 120 is able to perform communication processing with the information processing terminal 110 via the network I/F 121, and is configured to be able to notify the information processing terminal 110 of information about the inside of the printer A 120.

A CPU 122 outputs an image signal as output information to a printer engine 125, which is connected to a system bus 126, based on a control program stored in a ROM 124. Moreover, the CPU 122 performs processing based on, for example, an application program stored in the ROM 124. A RAM 123 functions as a main memory or work area for the CPU 122. Moreover, the RAM 123 is used for execution of a control program and as, for example, an output information loading region, an environmental data storage region, and a non-volatile random access memory (NVRAM). The ROM 124 stores, for example, a control program for the CPU 122, font data to be used for generating the output information, and information to be used by the printer A 120.

A printer engine 125 outputs an image signal as output information. The system bus 126 interconnects various devices.

Figure 3:
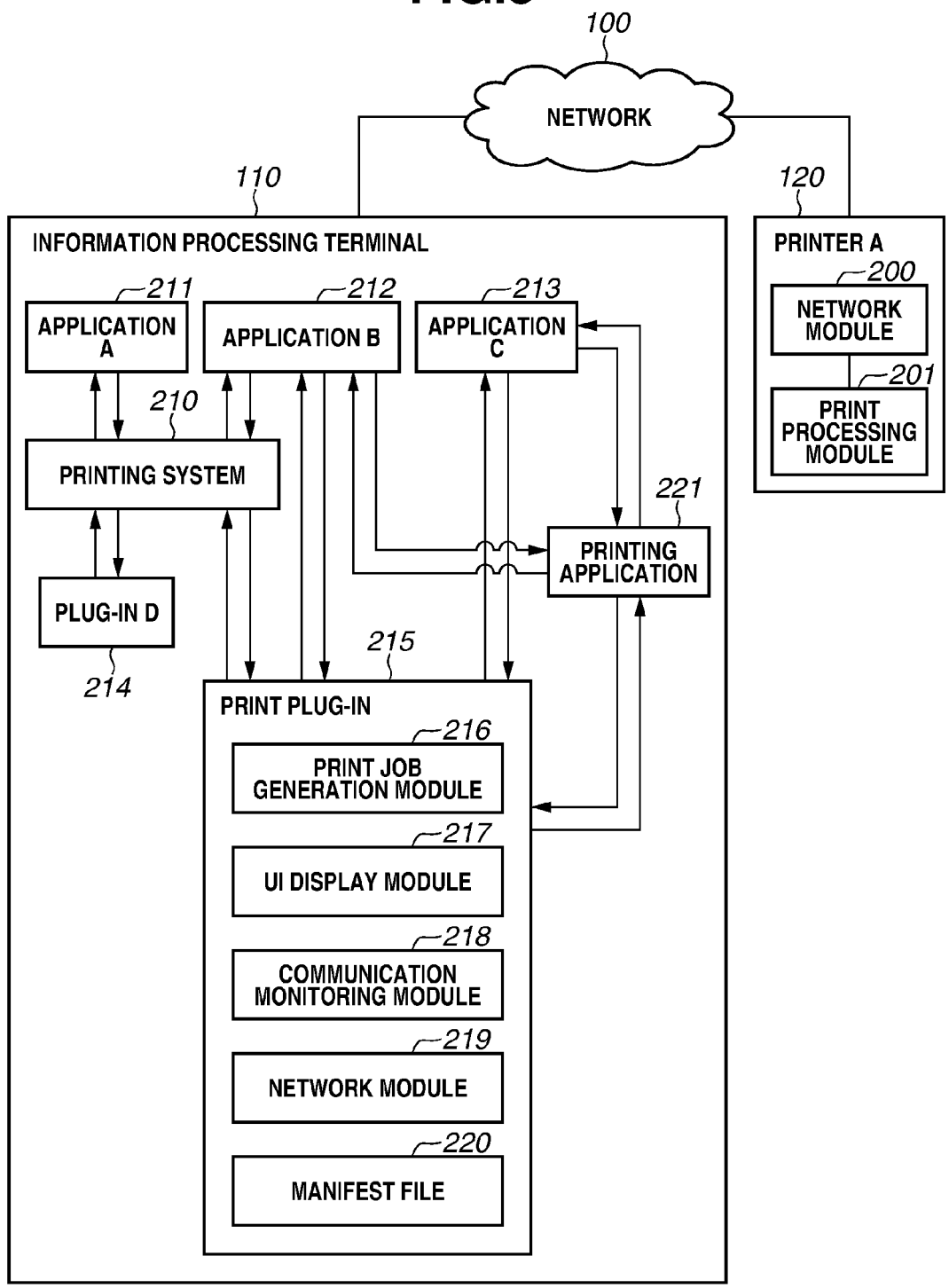
FIG. 3 is a software configuration diagram of the information processing terminal and the printer.

FIG. 3 is a block diagram illustrating a software configuration of the information processing terminal 110 and the printer A 120 in the present exemplary embodiment.

First, a software configuration of the information processing terminal 110 is described. Furthermore, respective modules which constitute the information processing terminal 110 are program modules existing as files stored in the ROM 112. Then, during execution, each module is loaded to the RAM 113 and executed by the OS or a module using that module. Furthermore, processing described in the present exemplary embodiment is implemented by the CPU 111 reading out applications stored in the ROM 112 and programs of the respective modules (software) to the RAM 113 as appropriate and executing them.

A printing system 210 provides a printing interface common to various applications, such as an application A 211. Each application is equipped with an interface defined by the printing system 210 and is thus able to execute a printing function provided by, for example, a plug-in D 214 or a print plug-in 215. At this time, the printing system 210 issues an instruction for printing by or searching for a print plug-in, such as the plug-in D 214 or the print plug-in 215.

The application A 211, an application B 212, and an application C 213 are general applications which run on the OS of the information processing terminal 110, and include various applications, such as a web browser, a PDF viewer, an Office viewer, a photo application, and an e-mail application. The application A 211 and the application B 212 are equipped with the respective printing interfaces defined by the printing system 210 and are able to use printing functions with the use of the respective print plug-ins. Furthermore, the application B 212 and the application C 213 are able to pass (share) data with another application via the Intent. The Intent is a share function to share (pass) data between an application and another application. For example, in a case where the application B 212 is a photo application, photo data can be passed with another application via the Intent.

The plug-in D 214 and the print plug-in 215 are print plug-ins, and exist as services that provide, for example, printing and searching functions to the printing system 210. The print plug-in is a mechanism in which each printer vendor is able to add in dependent processing for adapting to its print processing apparatus in a plug-in format. Examples of the functions which the plug-in D 214 and the print plug-in 215 provide to the printing system 210 include a searching function for printers on the network, a printing function, a print setting function, and a status notification function, and a plurality of print plug-ins can be installed.

The print plug-in 215 also operates as an application, and is able to share data with another application via the Intent. In the present exemplary embodiment, the print plug-in 215 temporarily behaves as an application, and performs processing for temporarily receiving print data from the printing application 221, launching the printing system 210, and passing the print data to the printing system 210. Then, the print plug-in 215 receives PDF-converted print data from the printing system 210, and behaves as a driver to perform printing. The print plug-in 215 includes various modules including a print job generation module 216 to a network module 219 and a manifest file 220.

The print job generation module 216 receives data in the PDF format from the printing system 210, and generates PDL data which is able to be used for printing by the printer A 120 based on information stored in the ROM 112 and the RAM 113. PDL data is an example of a file format which is able to be used for printing by the printer A 120. A user interface (UI) display module 217 is arranged to cause a setting screen unique to the print plug-in 215 to be displayed. For example, the UI display module 217 has a function to display a screen for indicating an end-user license agreement (EULA), a screen used for performing extended setting, and a dialog. A communication monitoring module 218 is a module that controls communication between the print plug-in 215 and the printer A 120, and manages acquisition of performance and status of a printer, search for printers, and transmission of PDL data generated by the print job generation module 216. The network module 219 is a module that connects the print plug-in 215 and a printer, such as the printer A 120, and provides a function to communicate with an external apparatus using a protocol, such as HyperText Transfer Protocol (HTTP) or Simple Network Management Protocol (SNMP).

The manifest file 220 (shared file) is a static file retained by the print plug-in 215, and contains a declaration called an "Intent filter". The Intent filter is used to declare which file format is supported in sharing data with an application via the Intent.

Figure 8:
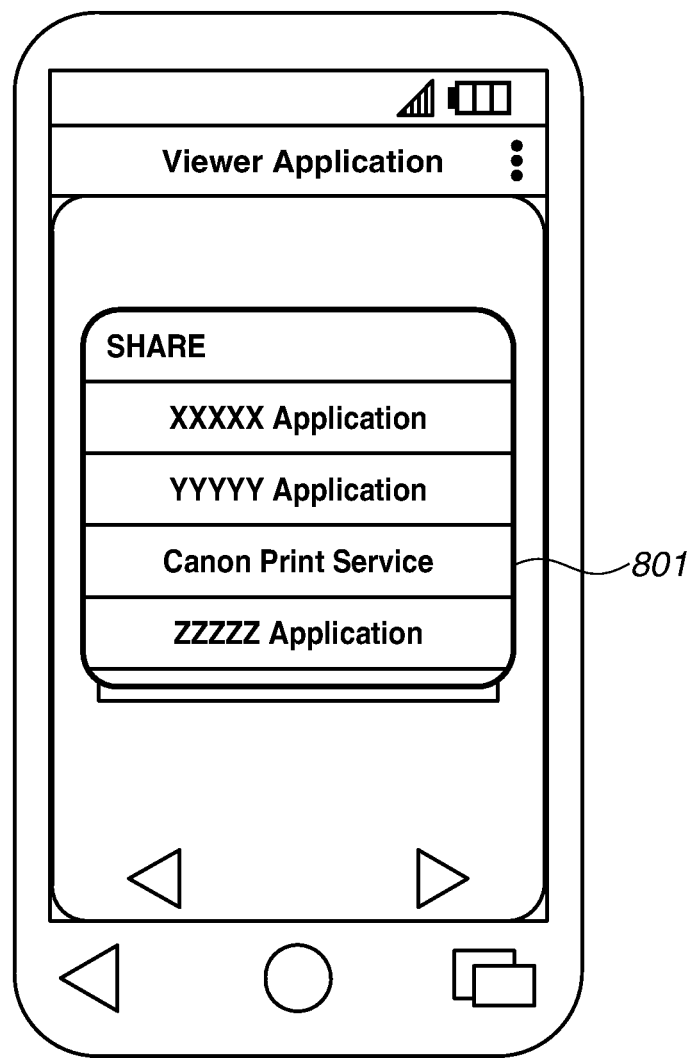
FIG. 8 illustrates a UI screen displayed when an Intent is used at the information processing terminal.

FIG. 4 illustrates an example of the Intent filter, which is described in Extensible Markup Language (XML). The Intent filter 401 is retained in the print plug-in 215. Furthermore, in the present exemplary embodiment, file formats which are able to be processed by the printing system 210 are described in the Intent filter. Examples of the file formats include a PDF file, an HTML file, and an image file. Owing to the description of file formats which are able to be processed, in a case where an application, such as the application B 212, specifies a file format and performs data sharing via the Intent, the print plug-in 215 is taken as a candidate for cooperation as indicated in an application selection screen 801 illustrated in FIG. 8. Details of the description made with reference to FIG. 8 are described below.

The printing application 221 is an application for printing, which singularly runs on the Android®, and is able to perform printing by receiving an instruction of the Intent from the application B 212 or the application C 213. The printing application 221 performs all of conversion processing from a supported file format into PDL at the inside of the printing application 221 itself. For example, the printing application 221 is able to perform printing of a slide, an Office file of ledger sheet, an image, and a web page.

Next, a software configuration of the printer A 120 is described.

A network module 200 is a module arranged to perform communication between the printer A 120 and the information processing terminal 110, and provides a function to communicate with an external apparatus using a protocol, such as HTTP or SNMP.

A print processing module 201 is a module arranged to generate image data from PDL data and send rendering data to the printer engine 125 so as to perform printing.

Next, a procedure for performing printing with an application is described with reference to FIGS. 5A, 5B, 5C, and 5D. FIGS. 5A to 5D are transition diagrams illustrating a method for performing printing with an application. The basic method for performing printing with an application includes two types of methods, one of which is a method using a printing system illustrated in FIG. 5A and the other of which is a method using the Intent to invoke a printing application illustrated in FIG. 5B. In the case of using a printing system, as illustrated in FIG. 6, the user selects a menu button 601 of the application and then selects a print button 603 in the displayed menu. On the other hand, in the case of using the Intent to invoke a printing application, the user selects a share button 602 in the displayed menu. FIG. 6 illustrates an example of a UI displayed in a case where printing is performed with an application, such as the application A 211.

Figure 5A:
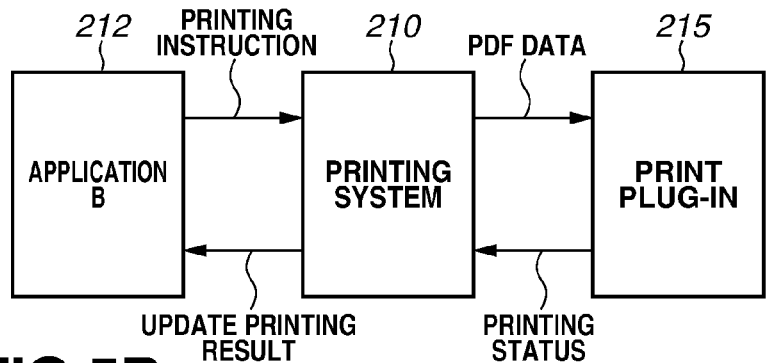
FIGS. 5A, 5B, 5C, and 5D are transition diagrams illustrating a print path and another print path.
Figure 6:
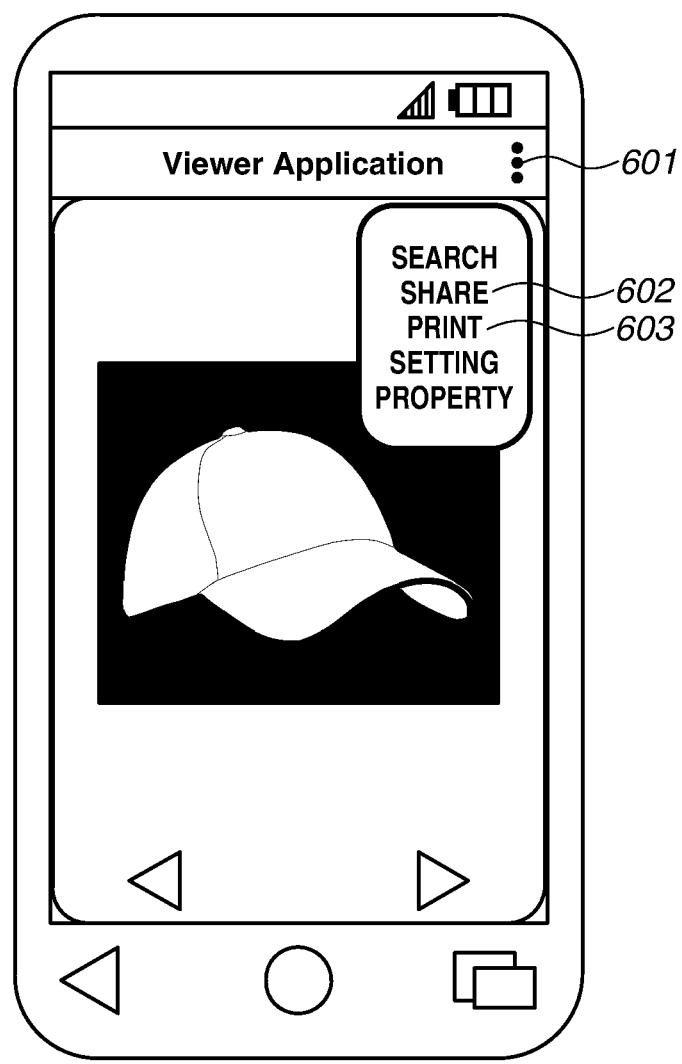
FIG. 6 illustrates a user interface (UI) screen of an application of the information processing terminal.
Figure 7:
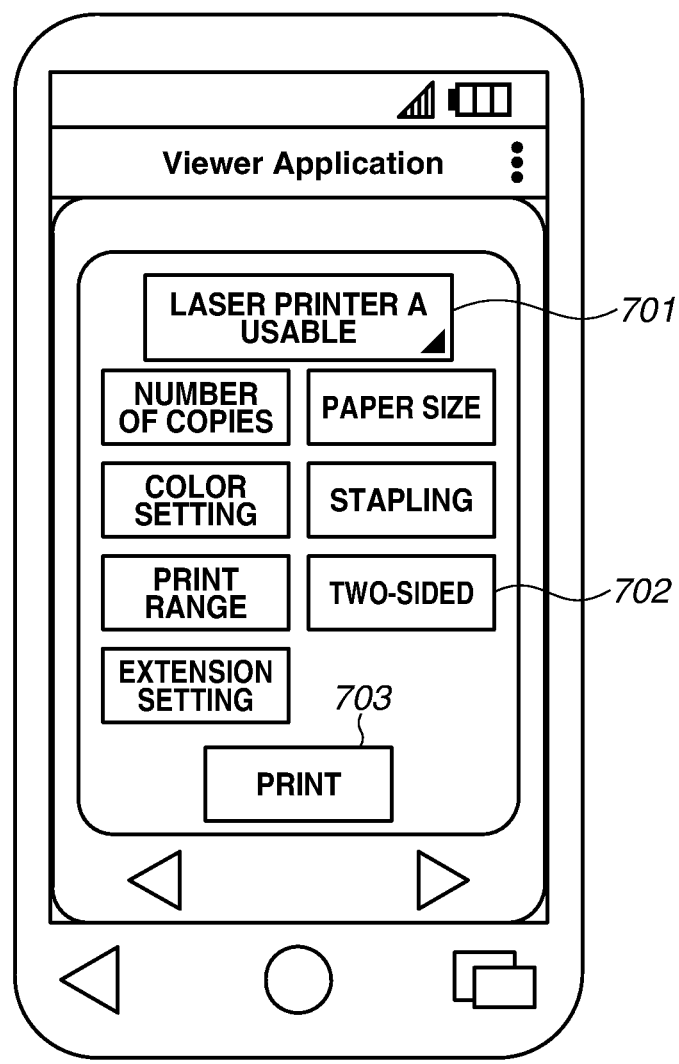
FIG. 7 illustrates a UI screen of a printing system of the information processing terminal.

First, the method using a printing system illustrating in FIG. 5A is described. As illustrated in FIG. 5A, in the case of performing printing by invoking a printing system from the application, the user presses the menu button 601 and then presses the print button 603 from the displayed menu, thus invoking a print setting screen of the printing system, such as that illustrated in FIG. 7, to perform printing. FIG. 7 illustrates an example of a print setting UI of the printing system. A printer which is displayed in a printer display region 701 illustrated in FIG. 7 is a printer searched for by the print plug-in 215 on the network. Furthermore, when a plurality of printers is usable, switching of printers is possible. Moreover, a standard print setting can be changed via, for example, buttons such as setting buttons 702. When a print button 703 is tapped, a printing instruction is sent from the printing system 210 to the print plug-in 215.

When the print button 703 is pressed, print processing is performed according to the transition illustrated in FIG. 5A. First, the application B 212 passes, to the printing system 210, a file that is able to be processed by a printing system and issues a printing instruction to the printing system 210. The printing system 210 displays a print setting UI of a printing system, and converts print data received from the application B 212 into PDF data. Then, the printing system 210 sends a printing instruction and PDF data to the print plug-in 215. The print plug-in 215, having received the PDF data, converts the PDF data into PDL data. Then, the print plug-in 215 transmits the PDL data to a printer to perform print processing. The print plug-in 215 returns a status about print processing to the printing system 210, and the printing system 210 reflects a result of printing in the UI.

Figure 5B:
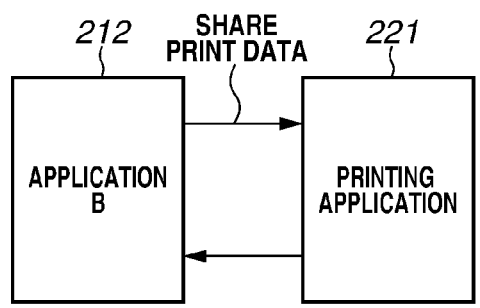

Next, the method using the Intent to invoke a printing application illustrated in FIG. 5B is described. As illustrated in FIG. 5B, in the case of using the Intent to invoke a printing application from the application, the user presses the share button 602 in the menu illustrated in FIG. 6 to display an application selection screen 801, such as that illustrated in FIG. 8, and then selects a printing application to perform printing.

FIG. 8 illustrates a screen used to select an application in the case of performing printing with an application using the Intent. In a case where a file format is specified when the Intent is used in the application, applications that are able to share the specified file format are displayed in the application selection screen 801. For example, in a case where the specified file format is PDF, PDF is described as a processable file format in the Intent filter 401 of an application serving as the print plug-in 215. Therefore, an application serving as the print plug-in 215 is also displayed in the application selection screen 801.

If the printing application 221 is selected in the application selection screen 801, print processing is performed according to the transition illustrated in FIG. 5B. First, the application B 212 passes (shares) print data to the printing application 221 via the Intent. The printing application 221 converts the received print data into PDL interpretable by a printer, and then transmits the PDL data to the printer A 120 to perform print processing. At this time, data that is able to be converted into PDL by the printing application 221 is limited to a file format that is supported by the printing application 221.

In a case where a printing system is able to be directly used from a menu of the application, the method illustrated in FIG. 5A can be selected, but, in a case where the application does not support the printing system, the method using the Intent illustrated in FIG. 5B is to be used to perform printing. However, in a case where a printing application is not downloaded on the information processing terminal, even the method illustrated in FIG. 5B cannot be used to perform printing. Accordingly, in a case where the application does not support the printing system and a printing application able to be used via the Intent is not installed, any method cannot be used to perform printing. Therefore, a printing method in the present exemplary embodiment in which, even if the application does not support the printing system, the printing system is used to perform printing is described with reference to FIG. 5C and FIG. 9.

Figure 5C:
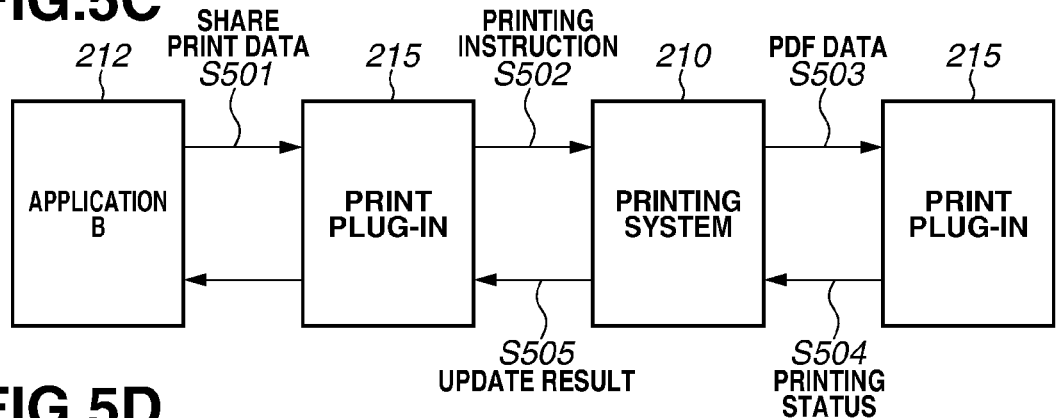

FIG. 5C illustrates a transition of processing performed by the application, the print plug-in 215, and the printing system 210 in the present exemplary embodiment.

In step S501, upon receiving an instruction of the Intent from the application B 212, the print plug-in 215 is launched. Moreover, the launched print plug-in 215 receives print data from the application B 212, and shares the print data with the application B 212. At this time, the flow illustrated in FIG. 9 starts.

In step S502, the print plug-in 215 issues a printing instruction to the printing system 210, launches the printing system 210, and passes the print data to the printing system 210. The printing system 210, having received the print data, converts the print data into PDF. Details thereof are described below with reference to FIG. 9.

In step S503, the printing system 210 passes the PDF data to the print plug-in 215 and sends a printing instruction to the print plug-in 215. The print plug-in 215, having received the PDF data, converts the PDF data into PDL. Then, the print plug-in 215 transmits the PDL data and a printing instruction to the printer A 120 to perform printing.

In step S504, the print plug-in 215 sends a printing status to the printing system 210, and, in step S505, the printing system 210 updates a UI regarding a printing result.

Figure 9:
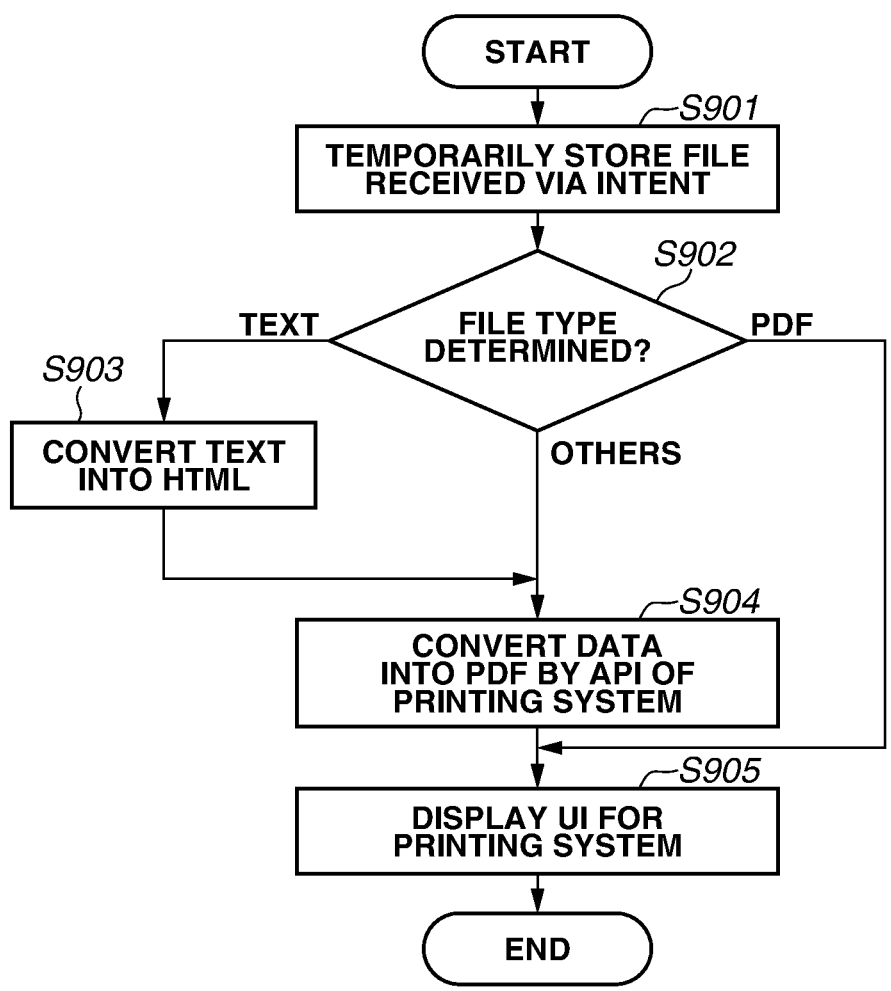
FIG. 9 is a flowchart illustrating processing performed by a print plug-in in a first exemplary embodiment.

Next, details of steps S501 and S502 are described. FIG. 9 is a flowchart illustrating processing performed by the print plug-in 215 and the printing system 210. The flowchart of FIG. 9 is executed on the information processing terminal 110. Processing illustrated in FIG. 9 is started by the print plug-in 215 being invoked and launched via the Intent by an application, such as the application B 212, in step S501.

In step S901, the print plug-in 215 temporarily stores print data in an application region (the RAM 113). The print data is data, such as image data, PDF data, and HTML data, which the print plug-in 215 has received via the Intent from an application, such as the application B 212. At this time, since only file formats that are able to be converted by the printing system 210 are stored in the manifest file 220 of the print plug-in 215, the print plug-in 215 does not receive any data that is unable to be processed by the printing system 210.

In step S902, the print plug-in 215 determines the file format of a file of the print data received via the Intent from the application. If the file format is text format (TEXT in step S902), then in step S903, the print plug-in 215 converts the print data into HTML format by adding tags for HTML to plain text, and the processing then proceeds to step S904. If the file format is PDF format (PDF in step S902), the processing proceeds to step S905. If the file format is other than text format and PDF format, such as an image or an HTML file, the processing proceeds to step S904.

In step S904, the print plug-in 215 passes the print data to an application programming interface (API) of the printing system 210 and issues an instruction for conversion to PDF and printing to the printing system 210. The printing system 210, having received the print data and the conversion instruction, converts the print data into PDF (PDF data). According to this processing, since the printing system 210 converts print data into PDF, the print plug-in 215 only needs to convert a PDF file into PDL, which is advantageous.

In step S905, the printing system 210 displays a UI for a printing system such as that illustrated in FIG. 7. At this time, when the printing system 210 is launched, a printer selected by default may not be able to be specified. For example, although the user has launched the print plug-in 215 via the Intent from the application, a default printer may become the plug-in D 214 when the printing system 210 is launched. In order not to give the user such a misunderstanding, it can be considered that the print plug-in 215 launches the printing system 210 after displaying a screen such as that illustrated in FIG. 10 using the UI display module 217, thus calling attention to the user. Furthermore, in step S502, the printing system 210, having received the printing instruction and the print data from the print plug-in 215, can perform processing in steps S904 and S905 at the same time or in reverse order. After that, the user can perform searching for printers, changing of print setting, and printing via a UI screen of the launched printing system 210 using the print plug-in 215.

In the present exemplary embodiment, when receiving print data via the Intent from a viewer application, the print plug-in 215, which operates as an application, actively launches the printing system 210 and passes the print data to the printing system 210, so that the printing system 210 converts the print data into PDF. The print plug-in 215 only needs to convert a PDF file into PDL. According to the above-described processing, even in a case where a viewer application does not support a printing system and there is no printing application that is able to be used by the viewer application, printing can be performed.

In the first exemplary embodiment, file formats that are able to be converted into PDF by the printing system 210 are previously described in the manifest file 220 of the print plug-in 215. Then, after receiving print data via the Intent from an application, the print plug-in 215 actively launches the printing system 210 and performs processing for causing the printing system 210 to perform file conversion. With the use of such processing, the print plug-in 215 is able to receive only a file on which the printing system 210 is able to perform conversion processing via the Intent. However, there are a great number of file formats that are able to be shared via the Intent but are not able to be converted by the printing system 210. For example, such file formats include a slide and an Office file of ledger sheet.

Furthermore, in many cases, the printing application 221 is able to convert data that is not able to be converted by the printing system 210. However, since the print plug-in 215 is predominantly higher in awareness than the printing application 221, many users have a situation in which the print plug-in 215 is installed on the information processing terminal 110 but the printing application 221 is not installed thereon. It can be considered that this is because, for example, in the case of Android® OS, while the user can readily jump from a print menu to a page usable to install a print plug-in, the user has to search Google Play® for a printing application.

In a second exemplary embodiment, in a case where the print plug-in 215 is invoked via the Intent with respect to a file format that is not able to be processed by the printing system 210, printing can be performed. Furthermore, processing described in the second exemplary embodiment is implemented by the CPU 111 reading out applications stored in the ROM 112 and programs of the respective modules (software) to the RAM 113 as appropriate and executing them.

The system configuration of the second exemplary embodiment is similar to that of the first exemplary embodiment, but the description in the manifest file 220 (shared file) differs between the first exemplary embodiment and the second exemplary embodiment. In the first exemplary embodiment, file formats that are supported by the printing system 210 are described in the Intent filter 401 of the manifest file 220, but, in the second exemplary embodiment, file formats equivalent to file formats that are supported by the printing application 221 via the Intent are described therein. Furthermore, in the second exemplary embodiment, the file formats that are supported by the printing system 210 are supposed to be included in the file formats that are supported by the printing application 221 via the Intent. In other words, describing the file formats that are supported by the printing application 221 via the Intent corresponds to describing file formats that are supported by any of the printing application 221 and the printing system 210. This provides an advantageous effect in that, since the number of file formats that are supported by the printing application 221 is generally greater than the number of file formats that are supported by the printing system 210, the print plug-in 215 can receive more instructions via the Intent.

Figure 11:
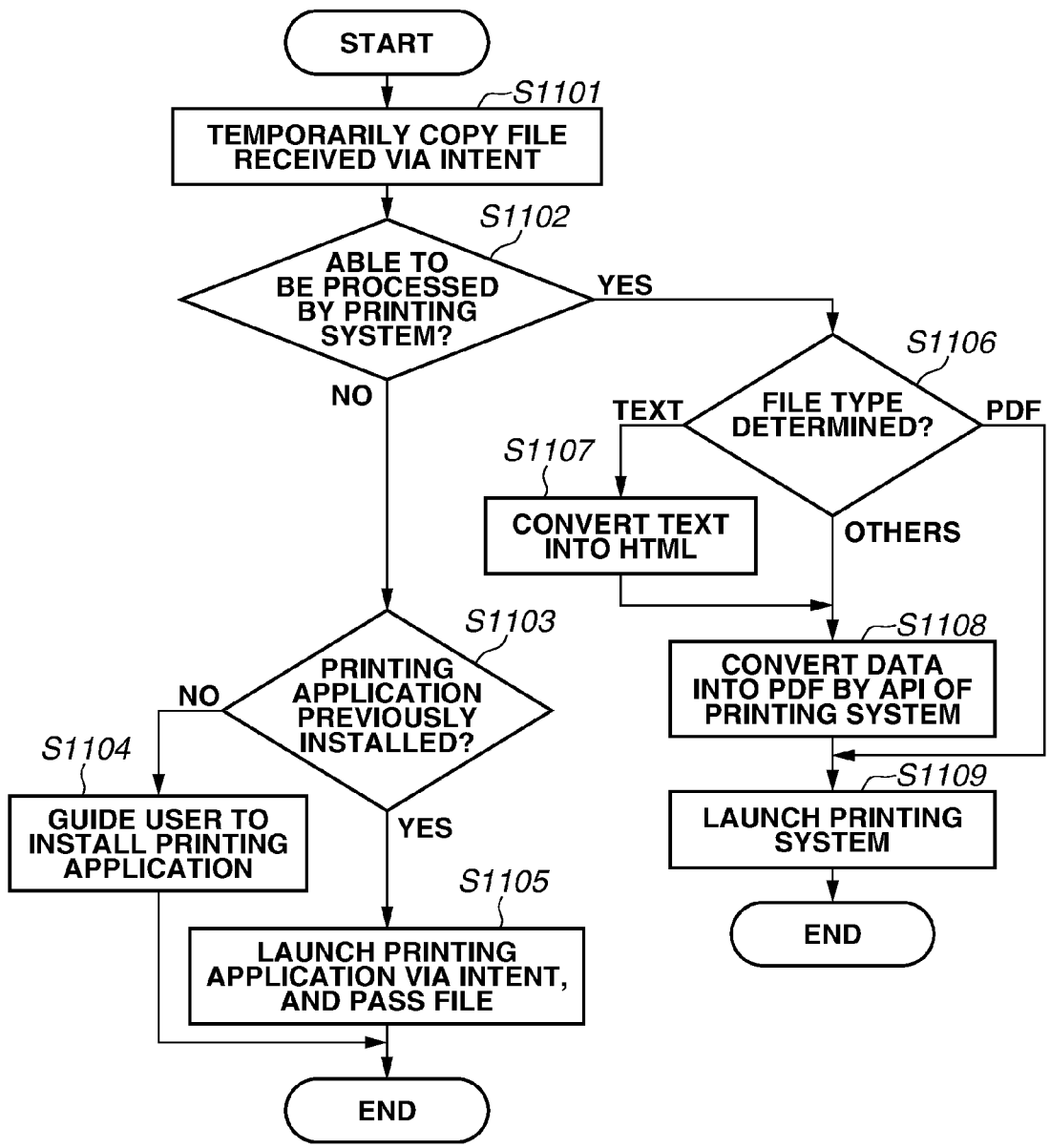
FIG. 11 is a flowchart illustrating processing performed by a print plug-in in a second exemplary embodiment.

The flow of print processing in the second exemplary embodiment is described with reference to FIG. 11. FIG. 11 is a flowchart illustrating processing performed by the print plug-in 215 in the second exemplary embodiment. The flowchart of FIG. 11 is executed by the information processing terminal 110, and represents processing performed by the print plug-in 215 when the print plug-in 215 is invoked via the Intent by an application, such as the application B 212.

Step S1101 is similar to step S901 in the first exemplary embodiment.

In step S1102, the print plug-in 215 determines whether the received file format is a file format that is able to be converted by the printing system 210. The file format that is able to be converted by the printing system 210 is previously determined according to the specifications of the printing system 210. If the received file format is a file format that is able to be converted by the printing system 210 (YES in step S1102), the processing proceeds to step S1106, and, if the received file format is a file format that is not able to be converted (NO in step S1102), the processing proceeds to step S1103.

In step S1103, the print plug-in 215 determines whether the printing application 221 is previously installed on the information processing terminal 110 (application determination). Whether the printing application 221 is previously installed can be determined by, for example, searching for the application identifier (ID) of the printing application 221 from a list of application IDs of installed applications, which is able to be acquired from the OS. If it is determined that the printing application 221 is not yet installed (NO in step S1103), the processing proceeds to step S1104, and, if it is determined that the printing application 221 is previously installed (YES in step S1103), the processing proceeds to step S1105.

In step S1104, the print plug-in 215 guides the user to install the printing application 221. For example, it can be considered that the print plug-in 215 displays a page for releasing the printing application 221 on Google Play® using a link function or connects to an application delivery server.

In step S1105, the print plug-in 215 launches the printing application 221 via the Intent. When performing launching via the Intent, the print plug-in 215 performs processing for passing the print data, which is temporarily copied in step S1101, to the printing application 221. The printing application 221, having received the print data, converts the print data into PDL data and performs print processing. Moreover, the print plug-in 215 can use a custom URL scheme to specify the printing application 221 or specify a screen to send a file.

Figure 5D:
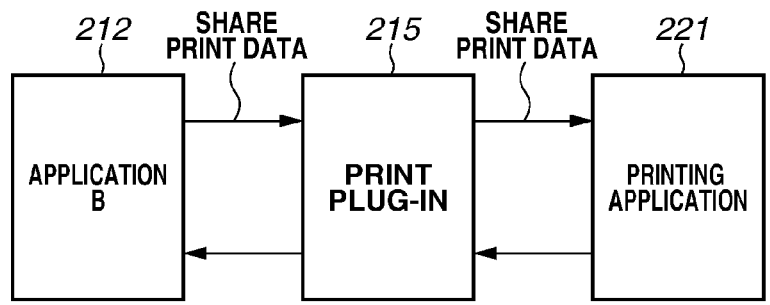

Furthermore, the transition of processing flow for performing step S1105 corresponds to that illustrated in FIG. 5D, in which the print plug-in 215 receives, from the application, an instruction for sharing print data via the Intent and the print plug-in 215 then performs processing for launching the printing application 221 via the Intent.

Processing in step S1106 to step S1109 is similar to processing in step S902 to step S905 in the first exemplary embodiment.

With the above-described processing, in the case of a file format that is not able to be processed by a printing system, a printing application is used to enable the user to perform printing, and, in a case where there is no installed printing application, the user is prompted to install a printing application.

While, in the second exemplary embodiment, in the case of a file that is not able to be processed by the printing system 210, data is passed to the printing application 221 to perform print processing, it can be considered that the print plug-in 215 has conversion and printing functions equivalent to those of the printing application 221. In that case, when the print plug-in 215 receives a file that is not able to be converted by the printing system 210, the print plug-in 215 displays a UI screen and performs processing up to printing. For that purpose, in addition to file formats that are able to be converted by the printing system 210, file formats that are converted by the print plug-in 215 itself are also described in the Intent filter of the manifest file 220 (shared file). Furthermore, processing described in the third exemplary embodiment is implemented by the CPU 111 reading out applications stored in the ROM 112 and programs of the respective modules (software) to the RAM 113 as appropriate and executing them.

Figure 12:
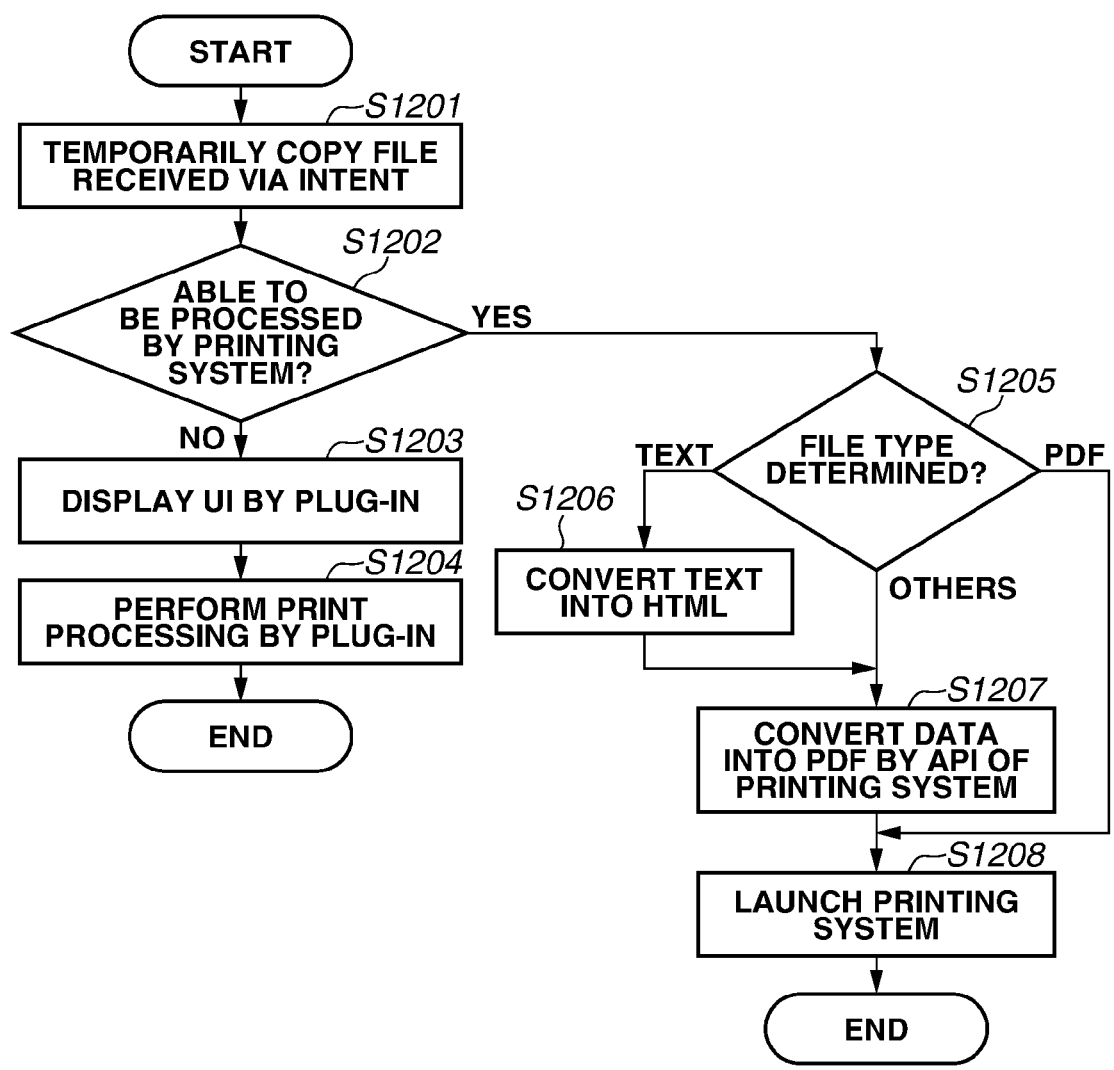
FIG. 12 is a flowchart illustrating processing performed by a print plug-in in a third exemplary embodiment.

The flow of print processing in the third exemplary embodiment is described with reference to FIG. 12. FIG. 12 is a flowchart illustrating processing performed by the print plug-in 215 in the third exemplary embodiment. The flowchart of FIG. 12 is executed by the information processing terminal 110, and represents processing performed by the print plug-in 215 when the print plug-in 215 is invoked via the Intent by an application, such as the application B 212.

Processing in step S1201 is similar to that in step S901 in the first exemplary embodiment.

In step S1202, the print plug-in 215 determines whether the file format of the received file is able to be processed by the printing system 210. If the file format is not able to be processed by the printing system 210 (NO in step S1202), the processing proceeds to step S1203, and, if the file format is able to be processed by the printing system 210 (YES in step S1202), the processing proceeds to step S1205.

In step S1203, the print plug-in 215 displays a UI, such as a search screen for printers or a print setting screen, in order for the print plug-in 215 itself to process and print the data copied in step S1201. During the search for printers, the communication monitoring module 218 performs broadcasting via SNMP to search for printers that respond to broadcasting on the network.

In step S1204, the print plug-in 215 itself performs print processing. For example, the print plug-in 215 converts the data copied in step S1201 into PDL that is able to be interpreted by the printer A 120 using the print job generation module 216, and transmits the PDL to the printer A 120.

Processing in step S1205 to step S1208 is similar to processing in step S902 to step S905 in the first exemplary embodiment.

With the above-described processing, in a case where a print plug-in receives, via the Intent, a file that is not able to be converted by a printing system, the print plug-in itself performs conversion processing, and is thus able to perform processing up to a search for printers and printing.

While, in Android®, it is impossible to specify a printer selected by default with respect to the printing system 210, the printing system 210 has the possibility of being equipped with a function to specify and activate a printer. In such a case, the following flow according to a fourth exemplary embodiment is implemented. Furthermore, processing described in the fourth exemplary embodiment is implemented by the CPU 111 reading out applications stored in the ROM 112 and programs of the respective modules (software) to the RAM 113 as appropriate and executing them.

Figure 13:
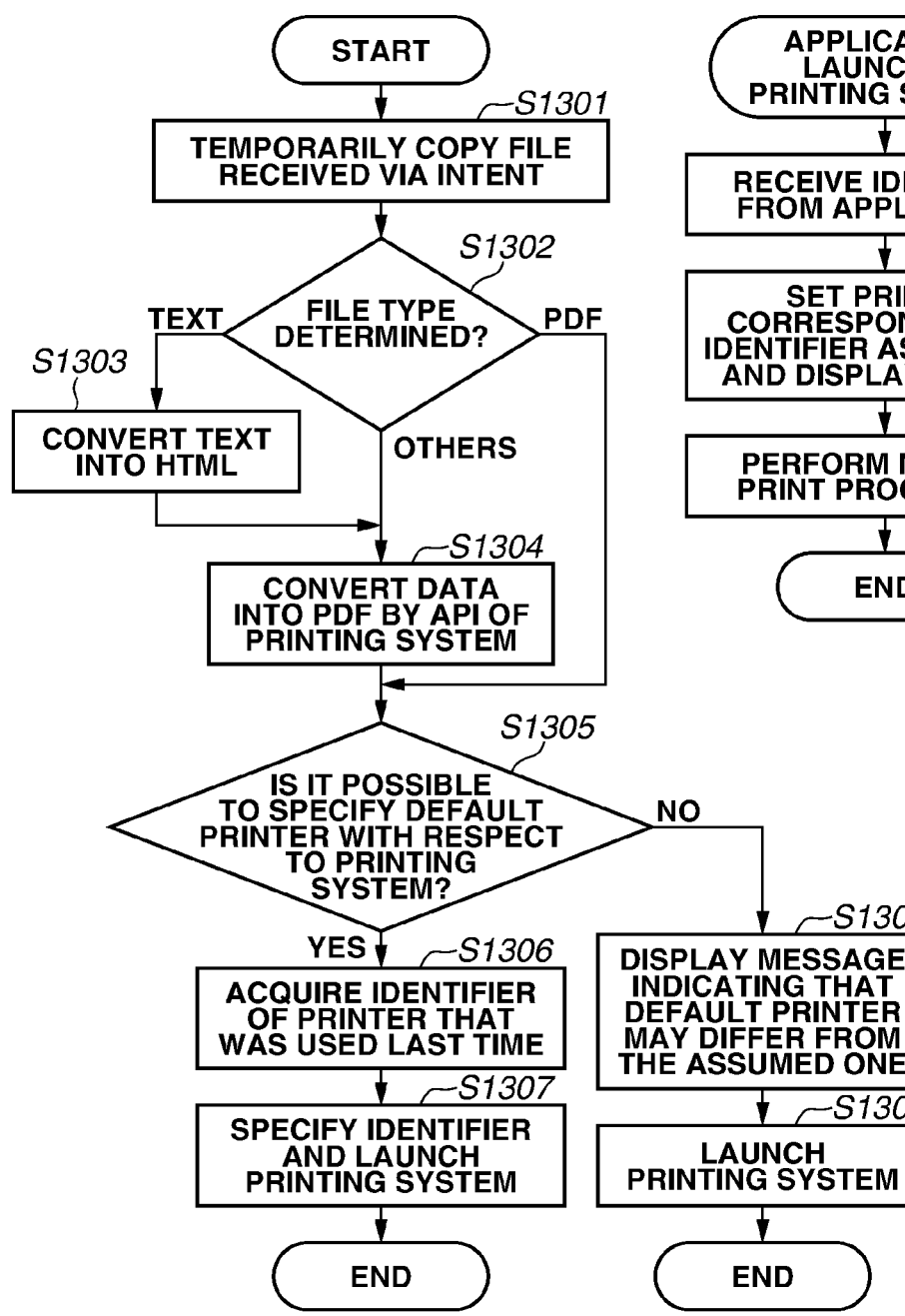
FIGS. 13A and 13B are flowcharts illustrating processing performed by a print plug-in and processing performed by a printing system, respectively, in a fourth exemplary embodiment.

First, processing performed by the print plug-in 215 is described. FIG. 13A is a flowchart illustrating processing performed by the print plug-in 215 in the fourth exemplary embodiment. The flowchart of FIG. 13A is executed by the information processing terminal 110, and represents processing performed by the print plug-in 215 when the print plug-in 215 is invoked via the Intent by an application, such as the application B 212.

Step S1301 to step S1304 are similar to step S901 to step S904 in the first exemplary embodiment.

In step S1305, the print plug-in 215 determines whether it is possible to specify a printer selected by default (predetermined) with respect to the printing system 210. The method for determination includes, for example, a method for determination according to the API level in Android® and a method for determination according to a printing-related API in Android®. If it is possible to specify a default printer (YES in step S1305), the processing proceeds to step S1306, and, if it is impossible to specify that (NO in step S1306), the processing proceeds to step S1308.

In step S1306, the print plug-in 215 acquires a printer identifier of the printer that was used for printing the last time from the inside of the print plug-in 215. Parameters called printer IDs for uniquely identifying printers are managed by the print plug-in 215 and the printing system 210, and are expressed by, for example, a media access control (MAC) address of a printer or a combination of the MAC address and a prefix or suffix. In step S1306, processing for acquiring a printer ID that was stored at the time of completion of printing from the print plug-in 215 is performed.

In step S1307, the print plug-in 215 passes, to the printing system 210, information about the printer including the printer ID acquired in step S1306 together with the print file copied in step S1301, and then launches the printing system 210. The printer that was used for printing the last time is specified as a default printer by steps S1306 and S1307.

Figure 10:
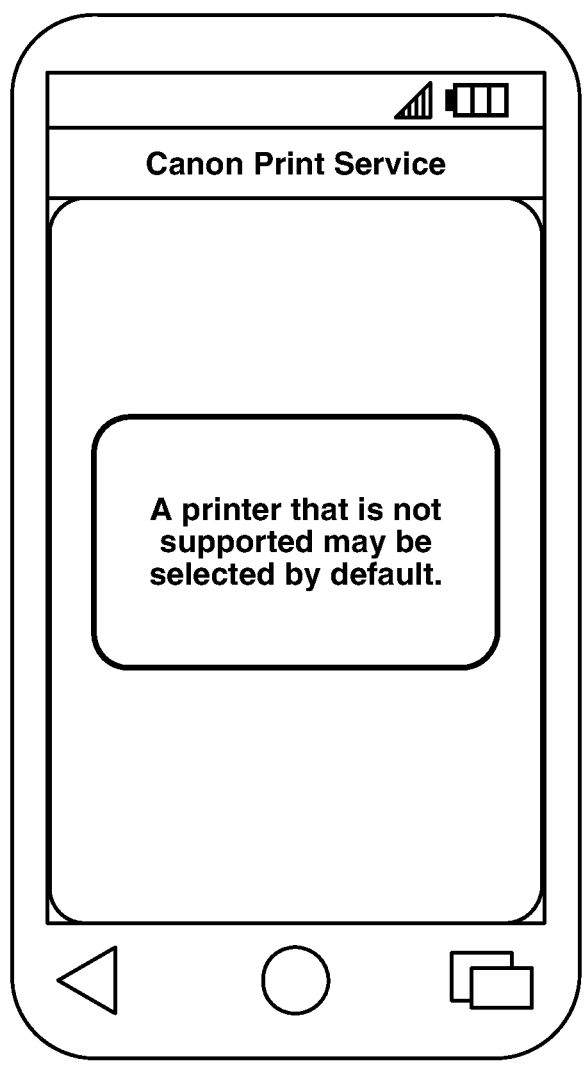
FIG. 10 illustrates a UI screen in the first exemplary embodiment.

In step S1308, which is performed in a case where it is impossible to specify a default printer with respect to the printing system 210, the print plug-in 215 displays, to the user, a message indicating that the printer selected by default may be a printer to be used for another print plug-in, as illustrated in FIG. 10.

In step S1309, the print plug-in 215 launches the printing system 210 as in step S905 in the first exemplary embodiment.

Next, processing performed by the printing system 210 is described with reference to FIG. 13B. This processing is performed after, in step S1307, the print plug-in 215 specifies a printer selected by default with respect to the printing system 210 and launches the printing system 210.

In step S1310, the printing system 210 receives information about the printer including the printer ID, which is an identifier of the printer, from the print plug-in 215.

In step S1311, the printing system 210 displays the received information about the printer as a default printer according to the information about the printer including the printer ID.

In step S1312, the printing system 210 performs normal print processing.

With the above-described processing, in a case where a print plug-in is able to specify a printer selected by default with respect to a printing system, the printing system can be launched with the printer specified.

In the first exemplary embodiment, after receiving print data via the Intent from an application, the print plug-in 215 actively launches the printing system 210 and performs processing for causing the printing system 210 to perform file conversion.

At this time, in a case where the print plug-in 215 is set disabled by the user, it is impossible to search for printers, so that, when the screen illustrated in FIG. 7 is displayed due to the transition operation performed by the user, a printer or printers that are supported by the print plug-in 215 cannot be displayed. More specifically, for example, in the case of Android® OS, a screen used for switching between enabling and disabling settings of the print plug-in 215 is prepared as a standard setting of the OS, and the user is allowed to switch such a setting at any time. On the other hand, regardless of whether the print plug-in 215 is enabled or disabled, the user is allowed to select the print plug-in 215 in the share screen illustrated in FIG. 8. Here, in a case where the print plug-in 215 is disabled, the print plug-in 215 is not able to perform search processing when the screen illustrated in FIG. 7 is displayed due to the screen transition, so that a printer or printers that are supported by the print plug-in 215 cannot be displayed.

Figure 14:
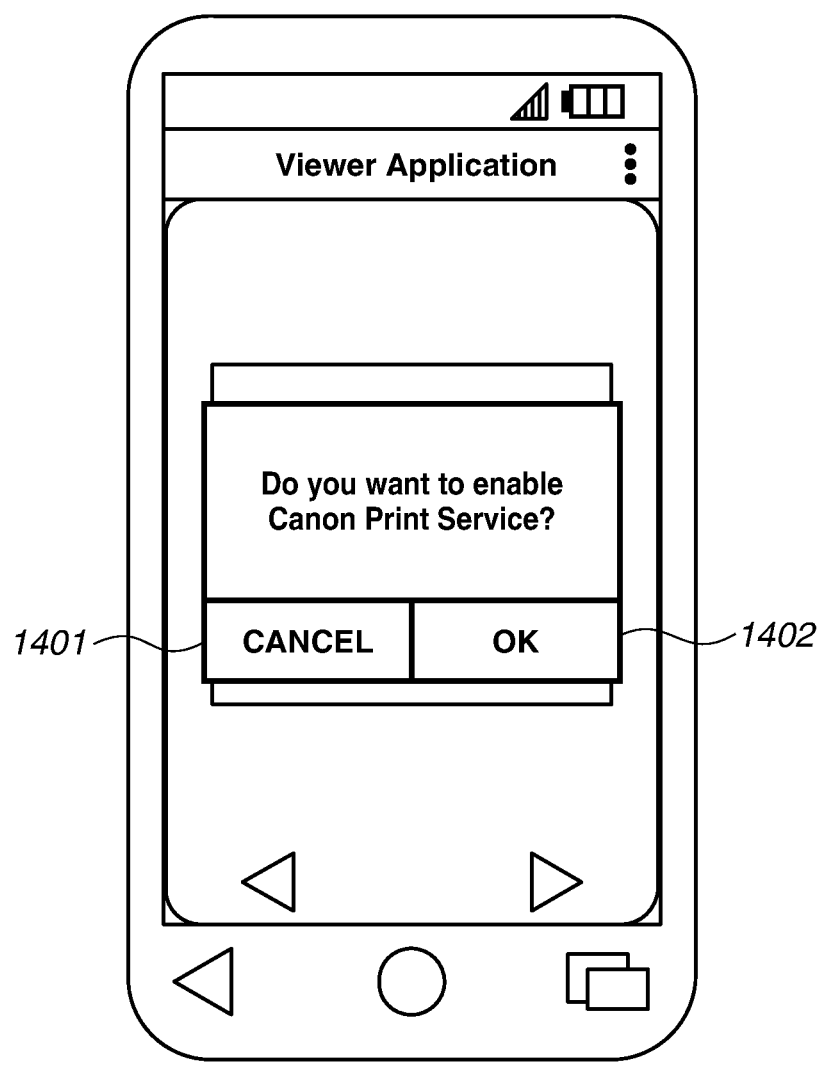
FIG. 14 illustrates a UI screen displayed when a print plug-in of the information processing terminal is disabled.
Figure 15:
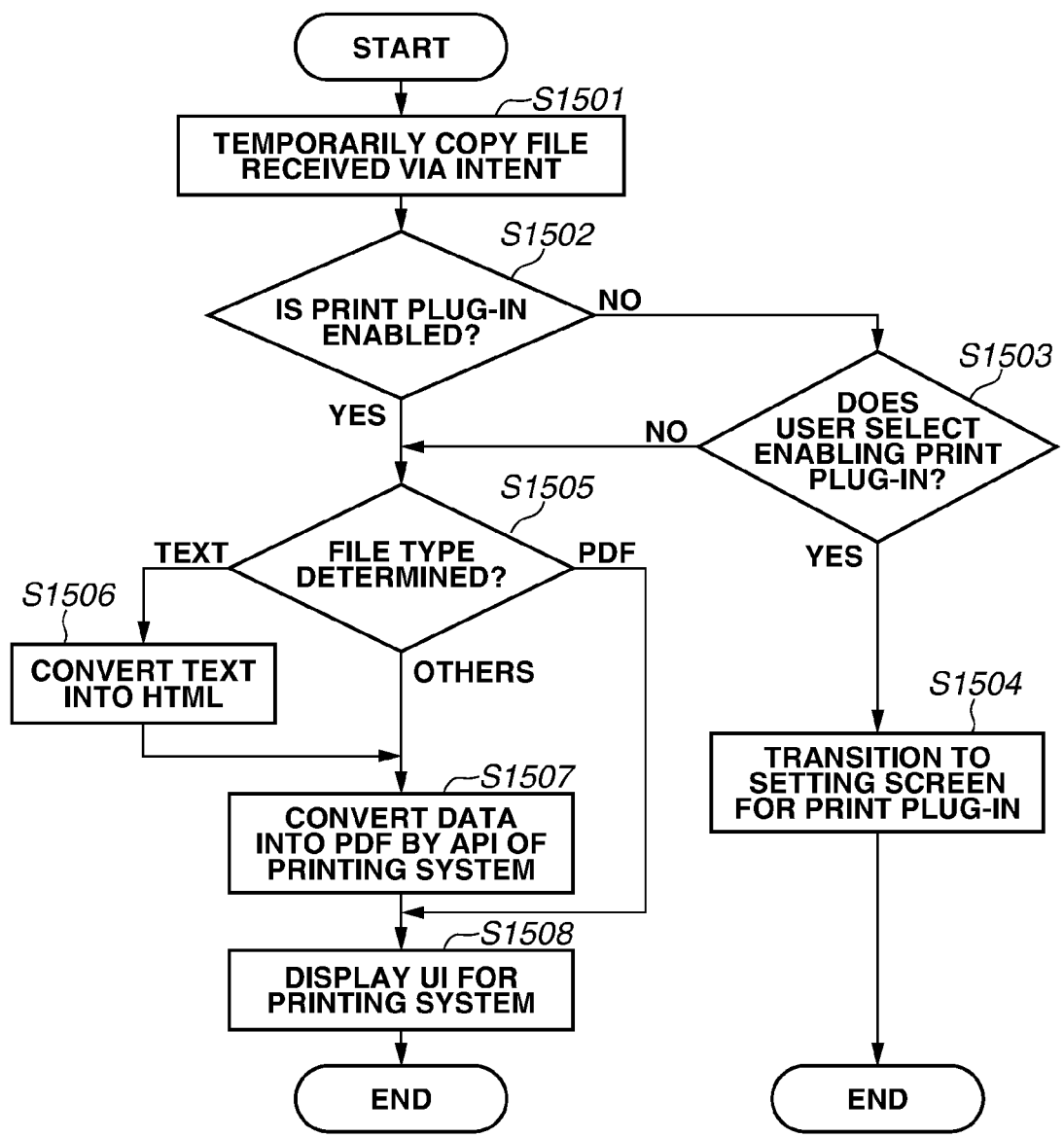
FIG. 15 is a flowchart illustrating processing performed by a print plug-in in a fifth exemplary embodiment.

In such a case, the following flow according to a fifth exemplary embodiment illustrated in FIG. 15, which is performed to enable displaying a dialog illustrated in FIG. 14, is implemented. Furthermore, processing described in the fifth exemplary embodiment is implemented by the CPU 111 reading out applications stored in the ROM 112 and programs of the respective modules (software) to the RAM 113 as appropriate and executing them.

The flow of print processing in the fifth exemplary embodiment is described with reference to FIG. 15. FIG. 15 is a flowchart illustrating processing performed by the print plug-in 215 in the fifth exemplary embodiment. The flowchart of FIG. 15 is executed by the information processing terminal 110, and represents processing performed by the print plug-in 215 when the print plug-in 215 is invoked via the Intent by an application, such as the application B 212.

Step S1501 is similar to step S901 in the first exemplary embodiment.

In step S1502, the print plug-in 215 determines whether the print plug-in 215 is enabled or disabled. If the print plug-in 215 is disabled (NO in step S1502), the processing proceeds to step S1503.

In step S1503, the print plug-in 215 displays the dialog illustrated in FIG. 14 and determines whether the user has selected enabling the print plug-in 215 or keeping the print plug-in 215 disabled. FIG. 14 illustrates an example of a UI displayed on the information processing terminal 110, which is a selection screen used for the user to select whether to enable the print plug-in 215. If the user presses an OK button 1402 to enable the print plug-in 215 (YES in step S1503), the processing proceeds to step S1504. If the user presses a cancel button 1401 (NO in step S1503), the processing proceeds to step S1505.

In step S1504, the print plug-in 215 displays a setting screen (ON/OFF screen) for the print plug-in 215, which is provided by the OS. Via the setting screen, the user is allowed to switch the print plug-in 215 from a disabled state to an enabled state. After setting the print plug-in 215 enabled, the user can re-perform printing via the application B 212, so that processing in a case where it is determined in step S1502 that the print plug-in 215 is enabled can be performed.

Even in a case where the user presses the cancel button 1401 in step S1503 and the processing proceeds to step S1505 with the print plug-in 215 kept disabled, processing in steps S1506 to S1508 can be performed. In steps S1505 to S1508, the same processing as that in steps S902 to S905 in the first exemplary embodiment is performed. However, since it is impossible to perform a search for printers by the print plug-in 215, a printer or printers that are supported by the print plug-in 215 are not displayed in the UI display of the print setting screen illustrated in FIG. 7, which is displayed in step S1508.

With the above-described processing, in a case where, when the user launches the print plug-in 215 via the Intent, the print plug-in 215 is in a disabled state, the user can be guided to the setting screen used to switch the print plug-in 215 between an enabled state and a disabled state.

An embodiment can also be implemented by processing for supplying a program for implementing at least one function of the above-described exemplary embodiments to a system or apparatus via a network or storage medium and allowing at least one processor in a computer of the system or apparatus to read out and execute the program. Moreover, an embodiment can also be implemented by a circuit that implements at least one function (for example, an application specific integrated circuit (ASIC)).

While thus far is the description of exemplary embodiments, the present invention is not limited to these exemplary embodiments, but can be modified or altered in various manners within the scope of the spirit thereof.

According to exemplary embodiments, an information processing apparatus with a simplified process of PDL conversion that supports a plurality of formats can be provided.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-055001 filed Mar. 18, 2016, which is hereby incorporated by reference herein in its entirety.

What is claimed is:

1. An information processing apparatus comprising:
   one or more processors; and
   a memory,
   wherein the one or more processors are configured to implement an application that supports two invoking methods including a first invoking method which is invoked by a first file of an extension supported by the application being shared by a sharing function of another application being executed and a second invoking method which is invoked from a printing system of an operating system by a second file targeted for print processing being received,
   wherein the application includes instructions, which when executed by the one or more processors, cause the information processing apparatus to:
   invoke, in a case where the first file is shared according to the first invoking method, the printing system by issuing a print instruction to the printing system using the shared first file, receive the second file converted from the first file according to the second invoking method, and perform print processing based on the second file.

2. The information processing apparatus according to claim 1, wherein the application includes a function to search for an image processing apparatus on a network.

3. The information processing apparatus according to claim 1, wherein, in a case where the first file is shared according to the first invoking method, the application determines whether the shared first file is a specific file format, and, in a case where the first file is the specific file format, the application converts the file format of the first file, invokes the printing system using the converted first file, receives the second file further converted from the first file according to the second invoking method, and performs print processing based on the second file.

4. The information processing apparatus according to claim 1, wherein the extension supported by the application is described in a file stored by the application in the memory.

5. The information processing apparatus according to claim 1, wherein the application determines whether the application is in an enabled state or a disabled state as a print plug-in, and wherein, if determining that the application is in the disabled state, the application receives an instruction for changing the application to the enabled state.

6. The information processing apparatus according to claim 1, wherein the application determines whether a second application is installed on the information processing apparatus and whether a file format of the first file is able to be processed by the printing system, and wherein, if determining that the second application is installed on the information processing apparatus and the file format of the first file is not able to be processed by the printing system, the application causes the second application to convert the first file into a file format that is able to be printed by an image processing apparatus, and, if determining that the second application is not installed on the information processing apparatus and the file format of the first file is not able to be processed by the printing system, the application displays a screen for prompting installing the second application.

7. A control method for an information processing apparatus that is able to execute an application, wherein the application supports two invoking methods including a first invoking method which is invoked by a first file of an extension supported by the application being shared by a sharing function of another application being executed and a second invoking method which is invoked from a printing system of an operating system by a second file targeted for print processing being received, and wherein the control method comprising, in a case where the first file is shared according to the first invoking method, invoking the printing system by issuing a print instruction to the printing system using the shared first file, receiving the second file converted from the first file according to the second invoking method, and performing print processing based on the second file.

8. The control method according to claim 7, wherein the application includes a function to search for an image processing apparatus on a network.

9. The control method according to claim 7, wherein, in a case where the first file is shared according to the first invoking method, the application determines whether the shared first file is a specific file format, and, in a case where the first file is the specific file format, the application converts the file format of the first file, invokes the printing system using the converted first file, receives the second file further converted from the first file according to the second invoking method, and performs print processing based on the second file.

10. The control method according to claim 7, wherein the extension supported by the application is described in a file stored by the application.

11. The control method according to claim 7, wherein the application determines whether the application is in an enabled state or a disabled state as a print plug-in, and wherein, if determining that the application is in the disabled state, the application receives an instruction for changing the application to the enabled state.

12. The control method according to claim 7, wherein the application determines whether a second application is installed on the information processing apparatus and whether a file format of the first file is able to be processed by the printing system, and wherein, if determining that the second application is installed on the information processing apparatus and the file format of the first file is not able to be processed by the printing system, the application causes the second application to convert the first file into a file format that is able to be printed by an image processing apparatus, and, if determining that the second application is not installed on the information processing apparatus and the file format of the first file is not able to be processed by the printing system, the application displays a screen for prompting installing the second application.

13. A non-transitory storage medium storing a program that causes an information processing apparatus to execute an application that supports two invoking methods including a first invoking method which is invoked by a first file of an extension supported by the application being shared by a sharing function of another application being executed and a second invoking method which is invoked from a printing system of an operating system by a second file targeted for print processing being received, wherein the application includes instructions, which when executed by the information processing apparatus with one or more processors, cause the information processing apparatus to:

invoke, in a case where the first file is shared according to the first invoking method, the printing system by issuing a print instruction to the printing system using the shared first file, receive the second file converted from the first file according to the second invoking method, and perform print processing based on the second file.

* * * * *